(12) United States Patent
Chaouachi et al.

(10) Patent No.: US 12,518,651 B2
(45) Date of Patent: Jan. 6, 2026

(54) METHOD AND SYSTEM FOR GENERATING VEHICLE PARAMETERS FOR TRAINING A USER TO SCORE A VEHICLE MANEUVER

(71) Applicant: CAE Inc., Saint-Laurent (CA)

(72) Inventors: Maher Chaouachi, Saint-Laurent (CA); Jean-Francois Delisle, Saint-Laurent (CA)

(73) Assignee: CAE Inc., Saint-Laurent (CA)

( * ) Notice: Subject to any disclaimer, the term of this patent is extended or adjusted under 35 U.S.C. 154(b) by 483 days.

(21) Appl. No.: 18/188,516

(22) Filed: Mar. 23, 2023

(65) Prior Publication Data

US 2023/0306870 A1 Sep. 28, 2023

Related U.S. Application Data

(60) Provisional application No. 63/269,797, filed on Mar. 23, 2022.

(51) Int. Cl.
*G09B 19/16* (2006.01)
*G06N 3/0475* (2023.01)
*G06N 3/08* (2023.01)

(52) U.S. Cl.
CPC ......... *G09B 19/165* (2013.01); *G06N 3/0475* (2023.01); *G06N 3/08* (2013.01)

(58) Field of Classification Search
CPC ...... G09B 19/165; G06N 3/0475; G06N 3/08; G06N 3/084; G06N 5/04
See application file for complete search history.

(56) References Cited

U.S. PATENT DOCUMENTS

| | | | | |
|---|---|---|---|---|
| 10,832,592 | B2 * | 11/2020 | Holder | G09B 19/165 |
| 2009/0220929 | A1 * | 9/2009 | Daniel | G09B 9/02 434/362 |
| 2018/0165979 | A1 * | 6/2018 | Correia Gracio | G09B 5/065 |

(Continued)

OTHER PUBLICATIONS

Stevens-Adams, S. M., Basilico, J. D., Abbott, R. G., Gieseler, C. J., & Forsythe, C. (Sep. 2010). Performance assessment to enhance training effectiveness. In Proceedings of the Interservice/Industry Training, Simulation, and Education Conference (No. 10228, pp. 1-9).

(Continued)

*Primary Examiner* — Sizo B Vilakazi
(74) *Attorney, Agent, or Firm* — Fasken Martineau DuMoulin LLP; Johann Gest (57) ABSTRACT

There is described a method and a system for training a user to score a vehicle maneuver: vehicle parameters are generated, using one of a machine learning model and a rule-based model, based on a target grade and a vehicle maneuver, the target grade being indicative of a given performance level of a pilot performing the vehicle maneuver, the vehicle parameters representing parameters of the vehicle during the vehicle maneuver, the vehicle parameters enabling evaluating a performance of the pilot during the vehicle maneuver. The vehicle parameters are provided for display providing the vehicle parameters for display, a subjective grade indicative of an estimated performance level of the pilot during the vehicle maneuver is received, and the target grade is provided for display to the user on the display device, thereby allowing the user to compare the subjective grade to the target grade.

20 Claims, 4 Drawing Sheets

(56) References Cited

U.S. PATENT DOCUMENTS

2019/0304324 A1* 10/2019 Delisle .................... G09B 9/24
2021/0241645 A1*  8/2021 Onur ....................... G09B 9/12
2023/0289663 A1*  9/2023 Brook, III ............... G06N 3/08

OTHER PUBLICATIONS

De Penning, L., Garcez, A., Lamb, L. C., & Meyer, J. J. (2011). A neural-symbolic cognitive agent for online learning and reasoning. In Proceedings of the Twenty-Second international joint conference on Artificial Intelligence (vol. 2, pp. 1653-1658). International Joint Conferences on Artificial Intelligence.

* cited by examiner

METHOD AND SYSTEM FOR GENERATING VEHICLE PARAMETERS FOR TRAINING A USER TO SCORE A VEHICLE MANEUVER

CROSS-REFERENCE

The present application claims priority from U.S. Provisional Patent Application Ser. No. 63/269,797 filed on Mar. 23, 2022.

FIELD

The present technology relates to vehicle simulation systems in general and more specifically to a method and a system for generating vehicle parameters for training a user such as an instructor of a vehicle simulation system to assess performances of vehicle maneuvers.

BACKGROUND

Vehicle simulators are used for training personnel to operate vehicles to perform maneuvers. As an example, flight simulators are used by commercial airlines and air forces to train their pilots to face various types of situations. A simulator is capable of simulating various functionalities of an aircraft, and of reproducing various operational conditions of a flight (e.g., takeoff, landing, hovering, etc.). A trainee (e.g., a pilot performing a training session) interacts with the simulator to control various functionalities of the simulated aircraft during a simulation executed by the simulator. Similarly, an instructor (e.g. an experienced pilot) may interact with the simulator for various purposes, including controlling a simulation currently executed by the simulator, creating or updating simulation scenarios, controlling the simulation environment of a trainee, etc.

A particular simulation scenario executed by the simulator generally consists of a set of pre-determined events occurring during the execution of the particular simulation scenario by the simulator. The results of the simulation scenario are exported as a log file comprising simulation data and corresponding times of occurrence for the simulation data. The evaluation of a trainee who has performed the simulation scenario is based on an interpretation of the log file by an instructor, and on visual subjective observations performed by the instructor during the simulation.

One issue related to the evaluation is its subjectivity, since two different instructors may make different visual observations and interpret the same log file differently. The subjectivity of the evaluation depends on various factors, such as attention, experience, exposure to different scenarios as well as the instructor's own training.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

Developers of the present technology have appreciated that training assessment is an important process in a simulation instructors' work, however, in some instances, instructors don't benefit from sufficiently developed and accurate tools that help them improve, maintain, compare and standardize their grading and assessment ability of performed vehicle maneuvers.

One or more embodiments of the present technology have been developed based on developers' appreciation that there is a need for tools which could help simulation training instructors to improve and standardize their ability to grade training simulation maneuvers, which could improve their own abilities as well as those of trainees.

More specifically, developers have appreciated that a computer software could graphically display to a user a simulation (that could be in form of an animation) of a vehicle such as an aircraft in which the pilot is performing a training scenario including one or more specific maneuver(s), as a non-limiting example a takeoff with an engine failure. At the end of the simulation, different vehicle parameters (such as, but not limited to, airspeed, bank angle, pitch, roll rate, vertical speed, angle of attack, the sequence of switches and buttons actioned by the pilots, etc. in the case of an aircraft flight simulator) are displayed to the user in the form of graphs, charts, drawings and values detailing how each maneuver was executed to guide the instructor in his grading process. Once the instructor provides his subjective grade, the software program could compare the subjective grade with the real objective grade of the maneuver to provide results and feedback to the user. The software program could also display the overall instructor's score and ranking with the other users of the software.

Developer(s) have appreciated that the vehicle parameters could be generated by a computer model, such as a rule-based model and/or a machine learning model, which could receive as an input a training scenario including one or more vehicle maneuvers to be performed, and generate vehicle parameters of the simulated vehicle during the maneuver. Further, such a model could also receive as an input a target grade which will be used to influence and guide values of the generated vehicle parameters. As a non-limiting example, the vehicle parameters may be generated in the form of a set of time series, each time series corresponding to values of a single vehicle parameter that has a relative importance in grading the maneuver.

The generated vehicle parameters may be transformed into a graphical form (e.g., images, animations, videos, plots, charts, and values) which could be displayed to the instructor for assessment. The instructor may analyze the vehicle parameters during the vehicle maneuver and grade a performance during the maneuver by providing a subjective grade. The subjective grade could then be compared with the target grade having been used to generate the vehicle parameters, and different indications could be provided to the instructor depending on the grade difference for improving his assessment abilities.

One or more embodiments of the present technology enable generating interactive simulations that enable instructors to engage more in depth with the material, where the simulation of the maneuver could be performed in low-fidelity or high-fidelity flight simulation devices.

One or more embodiments of the present technology enable providing visual aids and support, in the form of a sequences of images, videos, or animations can help instructors better understand complex concepts. As a non-limiting example, a video showing a step-by-step execution of a maneuver or its textual description generated based on the generated vehicle parameters may be provided to the instructors.

One or more embodiments of the present technology enable simulating providing real-world examples, which can help instructors relate theoretical concepts as well as standard operating procedures to practical situations.

One or more embodiments of the present technology can be used to provide gamification techniques including challenges, goals, rewards, feedback and/or competition between users to encourage progress.

One or more embodiments of the present technology can be used to provide feedback such as quizzes or assessments, which can help instructors in areas of focus.

Thus, embodiments of the present technology are directed to a methods, systems, and non-transitory storage mediums comprising computer-readable instructions for training a user to score a vehicle maneuver. There is also provided methods, systems and non-transitory storage mediums comprising computer-readable instructions for training machine learning models to generate vehicle parameters of a vehicle maneuver based on a target grade.

In accordance with a broad aspect of the present technology, there is provided a computer-implemented method for training a user to score a vehicle maneuver, the method being executable by at least one processor, the method comprising: generating, using one of a machine learning model and a rule-based model, vehicle parameters based on a target grade and a vehicle maneuver, the target grade being indicative of a given performance level of a pilot performing the vehicle maneuver, the vehicle parameters representing parameters of the vehicle during the vehicle maneuver, the vehicle parameters enabling evaluating a performance of the pilot during the vehicle maneuver, providing the vehicle parameters for display on a display device, receiving, from a user device, a subjective grade indicative of an estimated performance level of a pilot during the vehicle maneuver, and providing the target grade for display to the user on the display device, thereby allowing the user to compare the subjective grade to the target grade.

In one or more embodiments of the computer-implemented method, the generating the vehicle parameters is performed further based on at least one of a given vehicle model and a regulation level.

In one or more embodiments of the computer-implemented, the method further comprises comparing the subjective grade to the target grade, thereby obtaining a comparison result and providing the comparison result for display on the display device.

In one or more embodiments of the computer-implemented method, the comparison result comprises comparison parameters, and the computer-implemented method further comprises: generating at least one graphical representation based on the comparison parameters and the vehicle parameters, and providing the at least one graphical representation for display on the display device.

In one or more embodiments of the computer-implemented method, the at least one graphical representation comprises at least one of: a sequence of images, a video, an animation detailing the vehicle maneuver.

In one or more embodiments of the computer-implemented method, the method further comprises: generating a vehicle simulation based on the vehicle parameters, and providing the vehicle simulation for display on the display device.

In one or more embodiments of the computer-implemented method, the generating the vehicle simulation comprises generating a video depicting the vehicle maneuver.

In one or more embodiments of the computer-implemented method, the vehicle is one of: an aircraft, a land vehicle, and a sea vehicle.

In one or more embodiments of the computer-implemented method, the display device comprises a plurality of display devices, a given one of the plurality of display devices being part of a vehicle simulator.

In one or more embodiments of the computer-implemented method, the vehicle simulator comprises a virtual reality headset.

In one or more embodiments of the computer-implemented method, the machine learning model comprises a generative neural network.

In one or more embodiments of the computer-implemented method, the method further comprises generating the target grade based on one of: a random number and a user profile of the user scoring the vehicle maneuver.

In one or more embodiments of the computer-implemented method, the vehicle maneuver comprises: a take-off, a landing, a straight line, a landing, a take-off with an engine failure, and a landing with an engine failure.

In one or more embodiments of the computer-implemented method, the vehicle parameters comprise at least one of: an airspeed, a bank angle, a pitch, and a sequence of switches activated by the pilot.

In one or more embodiments of the computer-implemented method, at least one of the vehicle parameters varies in time during the given vehicle maneuver.

In one or more embodiments of the computer-implemented method, the generating the vehicle parameters is performed based on sets of previous vehicle parameters, each set of the previous vehicle parameters being associated with the given vehicle maneuver having been performed by a respective pilot having received the target grade.

In one or more embodiments of the computer-implemented method, the generating the vehicle parameters is performed by applying a statistical method on the sets of previous vehicle parameters.

In one or more embodiments of the computer-implemented method, the applying the statistical method comprises extracting statistical features and applying a condition with an associated confidence level on the statistical features to generate values for the vehicle parameters.

In one or more embodiments of the computer-implemented method, the generating the vehicle parameters comprises: receiving a relative importance of at least one vehicle parameter according to the target grade for the vehicle maneuver and generating the at least one vehicle parameter based on the relative importance of the at least one vehicle parameter.

In one or more embodiments of the computer-implemented method, the method further comprises, prior to the receiving the relative importance of the at least one vehicle parameter according to the target grade for the vehicle maneuver: determining the relative importance of the at least one vehicle parameter based on one of: a confidence interval, and past parameters for the given maneuver In accordance with a broad aspect of the present technology, there is provided a computer-implemented method for training a machine learning model to generate vehicle parameters representing a vehicle maneuver, the method being executed by a processor, the method comprising: receiving, from a database, previous vehicle maneuvers, each one of the previous vehicle maneuvers being associated with a respective set of previous vehicle parameters indicative of a respective previous vehicle maneuver having been performed by a respective pilot, and a respective grade indicative of a performance level of the respective pilot during the respective previous vehicle maneuver, generating a set of training objects, each training object including a respective previous vehicle maneuver, the respective grade and the respective set of vehicle parameters, and training, the machine learning model to generate the vehicle parameters based on a target grade and the respective previous vehicle maneuver, the training being based on the set of training objects, and outputting a trained machine learning model.

In one or more embodiments of the computer-implemented method, the training comprises modeling a joint distribution probability of at least two parameters of the respective sets of vehicle parameters.

In one or more embodiments of the computer-implemented method, the machine learning model is a restricted Boltzmann machine.

In accordance with a broad aspect of the present technology, there is provided a system for training a user to score a vehicle maneuver, the system comprising: at least one processor, and a non-transitory storage medium operatively connected to the at least one processor, the non-transitory storage medium comprising computer-readable instructions, the at least one processor, upon executing the computer-readable instructions, being configured for: generating, using one of a machine learning model and a rule-based model, vehicle parameters based on a target grade and a vehicle maneuver, the target grade being indicative of a given performance level of the pilot performing the vehicle maneuver, the vehicle parameters representing parameters of the vehicle during the vehicle maneuver, the vehicle parameters enabling evaluating a performance of the pilot during the vehicle maneuver, providing the vehicle parameters for display on a display device operatively connected to the at least one processor, receiving, from a user device operatively connected to the at least one processor, a subjective grade indicative of an estimated performance level of the pilot during the vehicle maneuver, and providing the target grade for display to the user on the display device, thereby allowing the user to compare the subjective grade to the target grade.

In one or more embodiments of the system, the generating the vehicle parameters is performed further based on at least one of a given vehicle model and a regulation level.

In one or more embodiments of the system, the processor is further configured for comparing the subjective grade to the target grade, thereby obtaining a comparison result and providing the comparison result for display on the display device.

In one or more embodiments of the system, the comparison result comprises comparison parameters, and the processor is further configured for: generating at least one graphical representation based on the comparison parameters and the vehicle parameters, and providing the at least one graphical representation for display on the display device.

In one or more embodiments of the system, the at least one graphical representation comprises at least one of: a sequence of images, a video, an animation detailing the vehicle maneuver.

In one or more embodiments of the system, the processor is further configured for: generating a vehicle simulation based on the vehicle parameters, and providing the vehicle simulation for display on the display device.

In one or more embodiments of the system, the generating the vehicle simulation comprises generating a video depicting the vehicle maneuver.

In one or more embodiments of the system, the vehicle is one of: an aircraft, a land vehicle, and a sea vehicle.

In one or more embodiments of the system, the display device comprises a plurality of display devices, a given one of the plurality of display devices being part of a vehicle simulator.

In one or more embodiments of the system, the vehicle simulator comprises a virtual reality headset.

In one or more embodiments of the system, the machine learning model comprises a generative neural network.

In one or more embodiments of the system, the processor is further configured for generating the target grade based on one of: a random number and a user profile of the user scoring the vehicle maneuver.

In one or more embodiments of the system, the vehicle maneuver comprises: a take-off, a landing, a straight line, a landing, a take-off with an engine failure, and a landing with an engine failure.

In one or more embodiments of the system, the vehicle parameters comprise at least one of: an airspeed, a bank angle, a pitch, and a sequence of switches activated by the pilot.

In one or more embodiments of the system, the at least one of the vehicle parameters varies in time during the given vehicle maneuver.

In one or more embodiments of the system, the generating the vehicle parameters is performed based on sets of previous vehicle parameters, each set of the previous vehicle parameters being associated with the given vehicle maneuver having been performed by a respective pilot having received the target grade.

In one or more embodiments of the system, the generating the vehicle parameters is performed by applying a statistical method on the sets of previous vehicle parameters.

In one or more embodiments of the system, the applying the statistical method comprises extracting statistical features and applying a condition with an associated confidence level on the statistical features to generate values for the vehicle parameters.

In one or more embodiments of the system, the generating the vehicle parameters comprises: receiving a relative importance of at least one vehicle parameter according to the target grade for the vehicle maneuver and generating the at least one vehicle parameter based on the relative importance of the at least one vehicle parameter.

In one or more embodiments of the system, the processor is further configured for, prior to the receiving the relative importance of the at least one vehicle parameter according to the target grade for the vehicle maneuver: determining the relative importance of the at least one vehicle parameter based on one of: a confidence interval, and past parameters for the given maneuver In accordance with a broad aspect of the present technology, there is provided a system for training a machine learning model to generate vehicle parameters representing a vehicle maneuver, at least one processor, and a non-transitory storage medium operatively connected to the at least one processor, the non-transitory storage medium comprising computer-readable instructions, the at least one processor, upon executing the computer-readable instructions, being configured for: receiving, from the non-transitory storage medium, previous vehicle maneuvers, each one of the previous vehicle maneuvers being associated with: a respective set of previous vehicle parameters indicative of a respective previous vehicle maneuver having been performed by a respective pilot, and a respective grade indicative of a performance level of the respective pilot during the respective previous vehicle maneuver, generating a set of training objects, each training object including a respective previous vehicle maneuver, the respective grade and the respective set of vehicle parameters, and training, the machine learning model to generate the vehicle parameters based on a target grade and the respective previous vehicle maneuver, the training being based on the set of training objects, and outputting a trained machine learning model.

In one or more embodiments of the system, the training comprises modeling a joint distribution probability of at least two parameters of the respective sets of vehicle parameters.

In one or more embodiments of the system, the machine learning model is a restricted Boltzmann machine.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It will be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document may include the document itself (i.e. its contents), or it may be a unique document descriptor identifying a file with respect to a particular file system, or some other means of directing the recipient of the indication to a network location, memory address, database table, or other location where the file may be accessed. As one skilled in the art will appreciate, the degree of precision required in such an indication depends on the extent of any prior understanding about the interpretation to be given to information being exchanged as between the sender and the recipient of the indication. For example, if it will be appreciated that prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it will not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" will not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Figure 1:
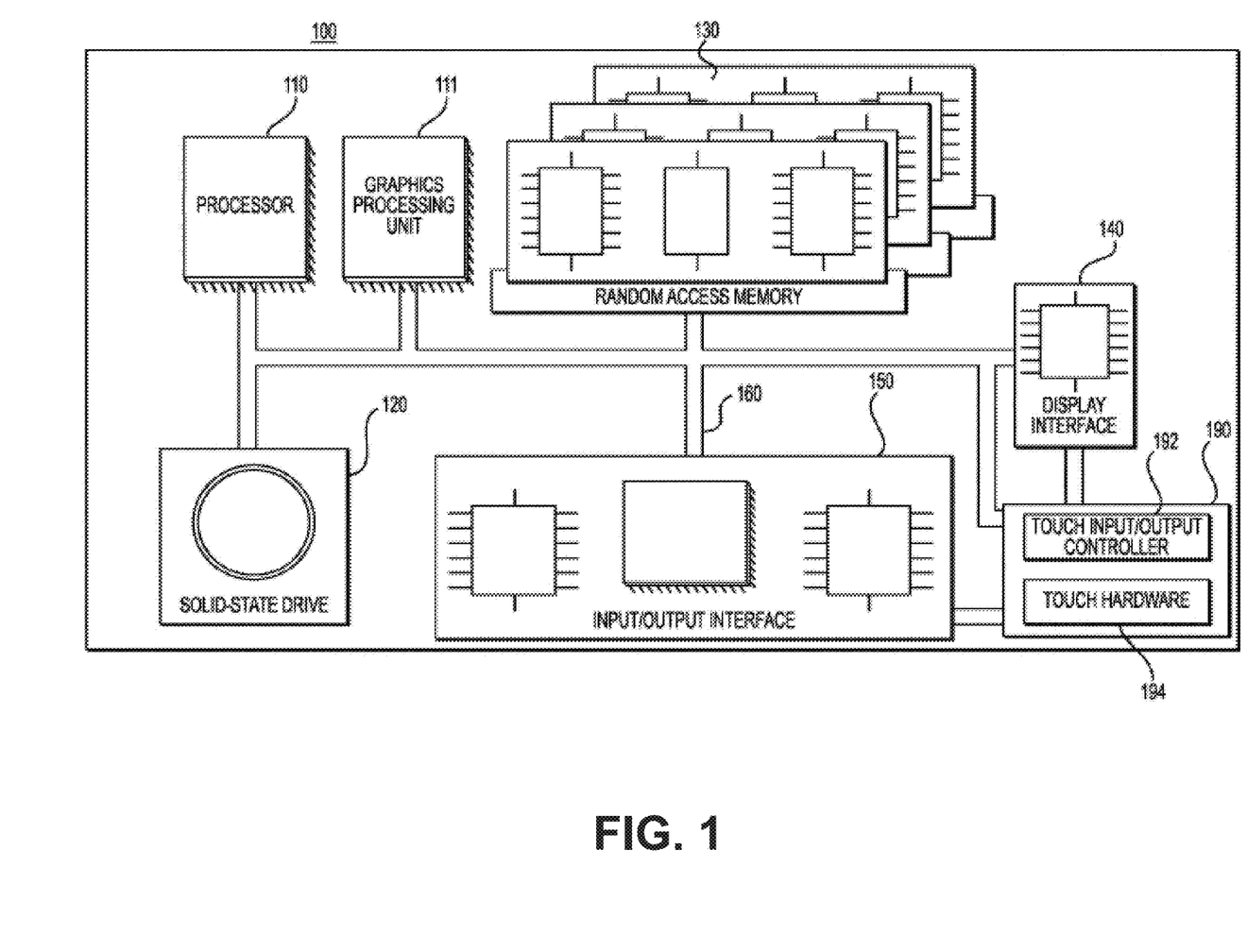
FIG. 1 is a block diagram illustrating an exemplary electronic device that may be used to implement the present technology.

Now referring to FIG. 1, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

System

Figure 2:
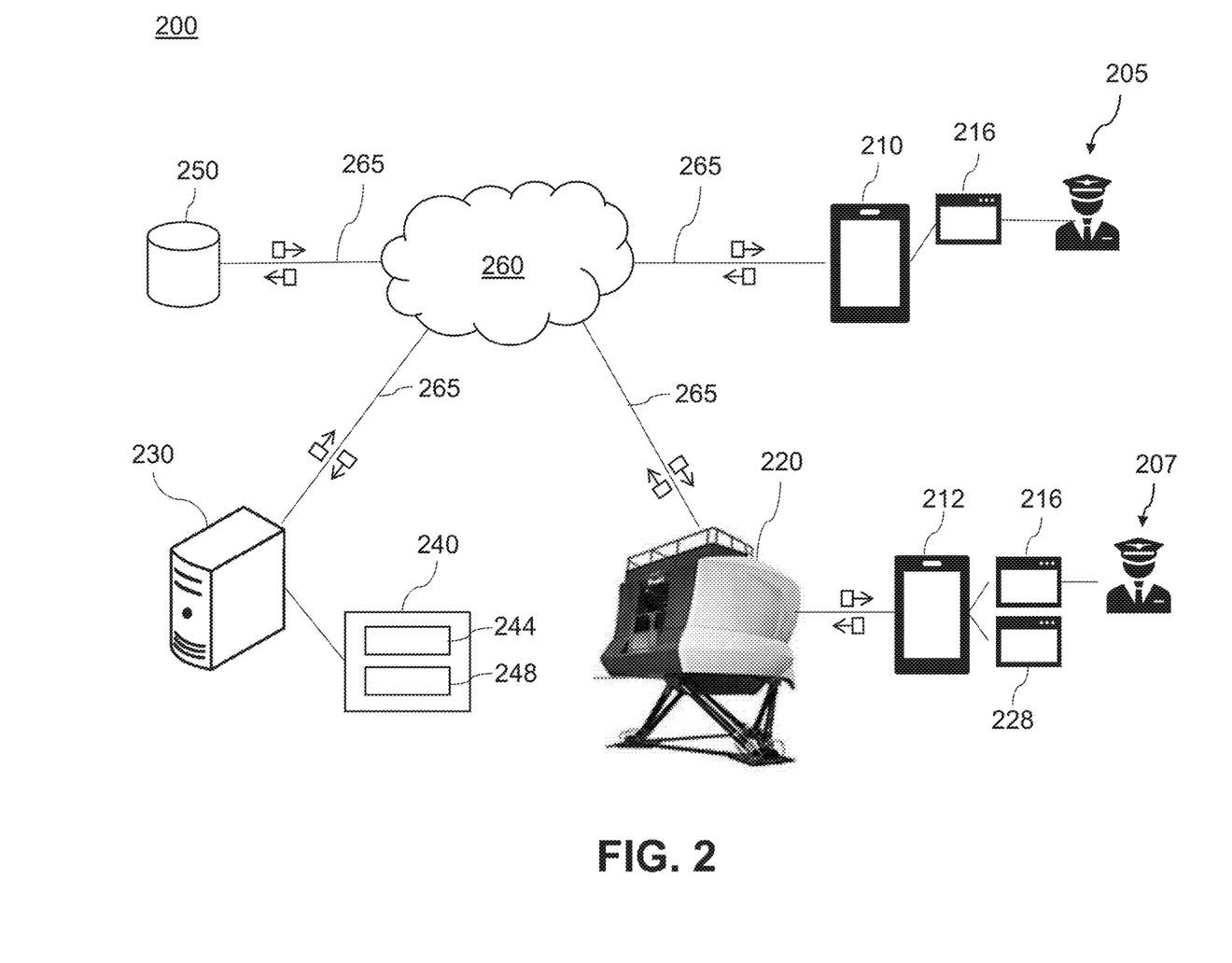
FIG. 2 is a block diagram illustrating an exemplary system that may be used to implement the present technology.

Now referring to FIG. 2, there is shown a schematic diagram of a simulation communication system 200, the simulation communication system 200 being suitable for implementing one or more non-limiting embodiments of the present technology. It will be appreciated that the simulation communication system 200 as shown is merely an illustrative implementation of the present technology. Thus, the description thereof that follows is intended to be only a description of illustrative examples of the present technology. In some cases, what are believed to be helpful examples of modifications to the simulation communication system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it will not be interpreted that no modifications are possible and/or that what is described is the sole manner of implementing that element of the present technology. As a person skilled in the art will appreciate, this is likely not the case. In addition, it will be appreciated that the simulation communication system 200 may provide in certain instances simple implementations of one or more embodiments of the present technology, and that where such is the case they have been presented in this manner as an aid to understanding.

The simulation communication system 200 comprises inter alia a first electronic device 210, a vehicle simulator 220, a second electronic device 212, a server 230, and a database 250 communicatively coupled over a communications network 260 via respective communication links 265.

First Electronic Device

The first electronic device 210 is associated with a user 205. The user 205 may be, as a non-limiting example, a vehicle instructor or a vehicle instructor trainee.

The first electronic device 210 is a computing device similar to the electronic device 100 and comprises one or more components of the electronic device 100 including at least one processor (e.g., processor 110 and/or GPU 111), a non-transitory storage medium, and a display and input/output components. As a non-limiting example, the first electronic device 210 may be implemented as a tablet of the user 205.

The first electronic device 210 executes an Instructor Operating Station (IOS) functionality 216 which will be explained in more detail below.

The user 205 may be an instructor or an instructor trainee associated with the vehicle simulator 220. In one or more embodiment, the user 205 is in charge of evaluating and grading performance of another user 207 operating the vehicle simulator 220.

Vehicle Simulator

The vehicle simulator 220 is configured to execute one or more simulations of operation of a vehicle, also known as training scenarios or simulation scenarios. A training scenario or training event includes one or more vehicle maneuvers for a given vehicle type. The vehicle simulator 220 is associated with a user 207 which may be a trainee operating the vehicle simulator 220.

The vehicle simulator 220 is any physical device that can be used for training a user 207 to operate a vehicle by providing a training maneuver to perform using an input/output interface. It will be appreciated that the type of vehicle simulated by the vehicle simulator 220 is not limited, and may include a land vehicle (e.g., car, truck, bus, motorcycle, all-terrain vehicle (ATV), etc.), an aircraft (e.g., commercial airplanes, military fighter jets, helicopters, etc.), a watercraft (e.g., boats, ships, etc.), and the like.

As a non-limiting example, the vehicle simulator 220 can be a desktop computer running a flight simulator program. As another non-limiting example, the vehicle simulator 220 can be a flight simulator physically reproducing the flight deck of an aircraft, including flight deck panels with manipulators, buttons, and displays. As yet another non-limiting example, the vehicle simulator 220 could be implemented using virtual reality (VR) devices, e.g., VR headset and VR controls.

Non-limiting examples of vehicle simulators include CAESprint™, and CAE XR Series (e.g., CAE400XR™, CAE500XR™, CAE600XR™, CAE6000XR™ CAE7000XR™) flight training devices and full-flight simulators available from CAE Inc. from Montreal, Canada.

In one or more embodiments, the vehicle simulator 220 comprises a computing device with at least one processor such as the processor 110 and/or GPU 11, and a non-transitory storage medium such as the solid-state drive 120 and/or the random-access memory 130 storing computer-readable instructions which can be executed by the at least one processor to perform the different functionalities which will be described below. In one or more embodiments, the second electronic device 212 is integrated into the vehicle simulator 220.

As a non-limiting example, for an aircraft, maneuvers that could be performed by the vehicle simulator 220 include one or more of: takeoff, landing, holding, rotation, step climb, top of climb, loiter, top of descent, final approach, go-around and the like.

As another non-limiting example, for a land vehicle, maneuvers that could be performed by the vehicle simulator 220 include accelerating, braking, cornering, lane changing, parking, reversing, hauling loads, navigating narrow or winding roads, and making turns in narrow spaces.

The execution of the simulation is generally performed in real time and encompasses a plurality of functions, which are performed sequentially or concurrently.

The execution of the simulation comprises executing one or more simulation functionalities (not shown). In the case of an aircraft simulator, examples of simulation functionalities include simulations of the following components of the aircraft: simulation of the engines, simulation of the landing gear, simulation of the electrical circuits, simulation of the hydraulic circuits, simulation of the cockpit, etc. Furthermore, the execution of particular simulation functionality may trigger the display of generated simulation data (e.g. in the form of a navigation map, a radar map, a weather map, a flight map, aircraft data, etc.) on a display (not shown) of the vehicle simulator 220. Simulation functionalities can be implemented separately in software modules executed by the vehicle simulator 220, or grouped per category of equipment, type of simulation, etc. into larger software modules. The vehicle simulator 220 is capable of executing several simulation functionalities in parallel, to perform an exhaustive simulation of a vehicle such as an aircraft. Alternatively, the vehicle simulator 220 executes a single simulation functionality (or a limited number of simulation functionalities) to perform a restricted simulation of the vehicle, focusing on specific systems and sub-systems, such as only the engines of an aircraft, only the engines and landing gear in combination of an aircraft and the like.

The execution of the simulation also comprises executing a simulator Graphical User Interface (GUI) functionality 228. The simulator GUI functionality 228 enable the user 207 (e.g., a trainee) to interact with the vehicle simulator 220, and more specifically with the simulation functionalities currently executed by the vehicle simulator 220 via its input/output devices. In the case of an aircraft simulator, the simulator GUI functionality 228 may simulate and display portions of aircraft flight control systems (AFCS), comprises displaying simulation data generated by the simulation functionalities on one or more displays of the vehicle simulator 220. The displayed simulation data includes one or more of: vehicle maneuver parameters, vehicle specific parameters, environmental parameters, maps, virtual controls, out-of-window information, etc. As a non-limiting example, for an aircraft, the displayed simulation data may include flight parameters (e.g., altitude, speed, etc.), aircraft parameters (e.g., remaining fuel, alarms, etc.), maps (e.g., navigation map, weather map, radar map, etc.), and the like.

The simulator GUI functionality 228 also comprises receiving interactions from the user 207 via one or more user interfaces of the vehicle simulator 220. The user interface(s) may include traditional computer user interfaces (e.g., a keyboard, a mouse, a trackpad, a touch screen, etc.), as well as dedicated simulation user interfaces for the simulated vehicle type (e.g., for an aircraft, cockpit control including switches, simulation command controls, joysticks, etc.). The user 205 and/or 207 may thus interact with the simulator GUI functionality 228 by changing vehicle operation parameters and vehicle specific parameters to execute a vehicle maneuver and receive feedback from the vehicle simulator 220.

In embodiments where the vehicle simulator 220 implements an aircraft simulator, the vehicle operation parameters may include aircraft flight control systems (AFCS) with primary controls and/or secondary controls. Primary controls including control yoke, rudder pedals, to control yaw, throttle or thrust controls. Secondary controls include trims, flaps, slats, spoilers, air brakes, variable-sweep wings, and the like.

The simulator functionality stores training session data or training scenario data which may include vehicle simulator data comprising input data (e.g. user interactions with the AFCS such steering, thrust for a flight simulator) input by the user 207 and output data computed by the vehicle simulator 220 (e.g., altitude and aircraft speed). In one or more embodiments the training session data is stored in the database 250. It will be appreciated that the training session data may be stored with a time stamp. In one or more embodiments, the training session data may be used for training one or more machine learning algorithms and/or for generating vehicle parameters using rule-based models.

IOS Functionality

The execution of the simulation also comprises executing an Instructor Operating Station (IOS) functionality 216.

In one or more embodiments, the IOS functionality 216 is executed by the first electronic device 210 of the user 205, the second electronic device 212 of the user 207 and the vehicle simulator 220. The second electronic device 212 may be implemented in a manner similar to the first electronic device 210.

The IOS functionality 216 enables a user 207 (e.g., an instructor or instructor trainee) to interact with the vehicle simulator 220, and more specifically with the simulation functionalities executed by the vehicle simulator 220. For instance, IOS User Interface (UI) pages are displayed on a display of the vehicle simulator 220 and/or the electronic device 215, allowing the user 207 to monitor and control in real time the execution of a particular simulation scenario executed by the simulation functionalities of the vehicle simulator 220. Additionally or alternatively, the IOS UI pages are displayed on a display of another computing device similar to the electronic device 100. In one or more embodiments, the training scenarios are presented in the form of a list of training events and/or list of vehicle maneuvers. It will be appreciated that events in list of events may be combined with other events and/or be subject to conditions such as regulations.

A training scenario is an event that is planned to occur during the training session. The scenario can be an event happening in a scenario script that is planned by the user 207 when designing the scenario script. As a non-limiting example, a scenario event for an aircraft can be an engine outage, one or more maneuvers, weather approaching the airport before takeoff, a go-around, or some other suitable event. A training scenario involves a group of actions or vehicle maneuvers that are performed for the scenario. This group of actions may be specified as required actions by a regulation including a standard, a rule, a policy, or some other suitable authority. As a non-limiting example, in a go-around scenario, a possible set of maneuvers are making a callout and setting the airplane in go-around (GA) thrust, making a callout for flaps and retracting the flaps, making a callout for positive climb and then performing actions for a gear up and retracting the gear using the correct control. Other types of maneuvers for an aircraft may for example include: roll maneuver, pitch maneuver, yaw maneuver, stall recovery maneuver, Immelmann maneuver, split-s maneuver, and the like which could be combined to form a training scenario.

The IOS comprises graphical control elements (e.g., menus and sub-menus, list boxes, etc.) for controlling the execution of the simulation (e.g., modifying simulation parameters) and graphical display elements (e.g., images, text fields, icons, embedded videos, etc.) for displaying simulation data generated by the simulation functionalities. In the case of an aircraft simulator, the user 205 or the user 207 interacts with the IOS via one or more user interfaces (e.g. a keyboard, a mouse, a trackpad, a touch screen, etc.) on the first electronic device 210, the second electronic device 212 and/or the vehicle simulator 220 to configure and/or update simulation parameters (e.g. weather conditions, flight plan, etc.) of the vehicle simulator 220. The configured/updated simulation parameters are processed by the simulation functionalities, and affect the simulation of one or more systems of the simulated vehicle (e.g., aircraft). The simulation parameters are tracked and stored in the database 250 or another non-transitory storage medium (not shown).

In one or more embodiments, the IOS functionality 216 provides a rating functionality which enables the user 205 to rate one or more of the vehicle maneuvers performed by the user 207 using the vehicle simulator 220 during a training scenario. It will be appreciated that the rating may be performed in real-time during at least a portion of the training scenario, or subsequent to the training scenario. In one or more embodiments, a graphical user interface (GUI) may be provided for rating the vehicle maneuvers of the training scenario by displaying the set of vehicle operation parameters during the vehicle maneuvers, as well as images, videos, animations and additional data related to the maneuver. One or more of the set of vehicle operation parameters may be displayed in the form of values, plots, charts, drawings detailing how each maneuver is performed during a training scenario. The user 205 may then provide ratings or subjective grade, comments related to the performance of the user 209 during the training scenario or maneuver.

The IOS functionality 216 stores the instructor rating data of the user 205 in the database 250 together with an indication of the training scenarios including vehicle maneuvers and associated set of vehicle operation parameters in function of time, etc. As a non-limiting example, the IOS functionality 216 may store values of vehicle parameters, as well as recordings of the training events. In one or more embodiments, the instructor rating data are stored together with the user training data in the database 250.

In one or more embodiments, the IOS functionality 216 enables training instructors such as the user 205 to rate training scenarios including vehicle maneuvers by providing past training data (i.e., past vehicle maneuvers including past vehicle parameters and related data) and/or generated training scenarios including one or more vehicle maneuvers based on a target grade for assessment and evaluation.

As a non-limiting example, the training events may be generated by one or more machine learning algorithms and/or rule-based methods based on a target grade for the purpose of training the user 205, as will be described in more detail below.

The generated training scenarios including generated vehicle maneuvers may be displayed to the user 205 in a manner similar to how real training events performed by a trainee such as the user 207 using the vehicle simulator 220 would be displayed to the user 205 on a display device of the first electronic device 210 and/or other display device.

The generated training scenarios, which include at least one vehicle maneuver, may then be rated by the user 205, i.e. the user 205 may input a subjective grade for the training scenario comprising the at least one maneuver, which are indicative of a performance of the vehicle maneuver according to the user 205.

The IOS functionality 216 is configured to receive the subjective grade of the user 205, and to compare the subjective grade of the user 205 with the target grade used for generating the set of vehicle operation parameters of the vehicle maneuver. In one or more embodiments, the comparison of the subjective grade and the target grade may include comparing vehicle parameters to one or more threshold or intervals which influence the grading of the maneuver.

The IOS functionality 216 is configured to display the target grade to the user 205, together with the set of vehicle operation parameters which may be displayed in the form of values, plots, charts, drawings detailing the vehicle parameters. In one or more embodiments, the IOS functionality 216 is also configured to display a relative importance of one or more of the set of vehicle operation parameters in assessing the performance of the vehicle maneuver (i.e., vehicle parameters that impact grading of the vehicle maneuver), as well as markings on the plots, charts, and drawings showing critical points which influence the scoring of the vehicle maneuver. It will be appreciated that the relative importance of the parameters for each maneuver may be predetermined by an operator and/or determined by using statistical methods and/or by a set of machine-learning models having been trained therefor.

The user 207 may then provide ratings or subjective grade, comments related to the performance of the user 209 during the training scenario or maneuver.

Server

The server 230 is configured to inter alia: (i) access past training data of training scenarios performed on one or more simulators such as the vehicle simulator 220; (ii) access past instructor rating data related to the past training data; (iii) access a set of parameter-generating models 240 including machine learning or rule-based models; (iv) if using machine learning, train one or more the set of parameter-generating models 240 on the past training data and the past instructor rating data to generate vehicle maneuvers based on a target grade; and (v) use the set of parameter-generating models 240 for generating vehicle maneuvers based on target grades for training vehicle instructors.

How the server 230 is configured to do so will be explained in more detail herein below.

It will be appreciated that the server 230 can be implemented as a conventional computer server and may comprise at least some of the features of the electronic device 100 shown in FIG. 1. In a non-limiting example of one or more embodiments of the present technology, the server 230 is implemented as a Dell™ PowerEdge™ Server running the Microsoft™ Windows Server™ operating system. Needless to say that the server 230 may be implemented in any other suitable hardware and/or software and/or firmware or a combination thereof. In the disclosed non-limiting embodiment of present technology, the server 230 is a single server. In one or more alternative embodiments of the present technology, the functionality of the server 230 may be distributed and may be implemented via multiple servers (not shown).

It will be appreciated that the implementation of the server 230 is well known to the person skilled in the art. However, the server 230 comprises a communication interface (not shown) configured to communicate with various entities (such as the database 250, for example and other devices potentially coupled to the communication network 260) via the network. The server 230 further comprises at least one computer processor (e.g., the processor 110 of the electronic device 100) operationally connected with the communication interface and structured and configured to execute various processes to be described herein.

Parameter Generating Models

The server 230 has access to a set of parameter-generating models 240. The set of parameter-generating models 240 are configured to generate a set of vehicle operation parameters associated with a vehicle maneuver based on past training data and past instructor rating data. The generated set of vehicle operation parameters together with the vehicle maneuver are then used for training instructors to rate vehicle maneuvers.

The set of parameter-generating models 240 includes one or more machine learning (ML) models, algorithms or applications 244 (which will be referred to as one or more ML models 244), and/or one or more rule-based models 248. It will be appreciated that in accordance with some embodiments of the present technology, the set of parameter-generating models 240 may only include machine learning models or rule-based models.

The one or more ML models 244 are generally configured to generate new, fake samples given a dataset of real or simulated data by implicitly learning the probability distribution underlining data. In one or more embodiments, the one or more MLA 224 is configured to model a joint distribution probability of at least two parameters of the respective sets of vehicle parameters.

The one or more ML models 244 are configured to inter alia: (i) receive as an input a vehicle maneuver; and (ii) generate, using the vehicle maneuver, a set of vehicle operation parameters representing parameters of the vehicle during the vehicle maneuver, the target grade being indicative of a performance of the vehicle maneuver.

In one or more embodiments, the one or more ML models 244 are configured to inter alia: (i) receive as an input a vehicle maneuver associated with a given vehicle type; (ii) receive a target grade for the vehicle maneuver; and (ii) generate, using the vehicle maneuver, based on the target grade, a set of vehicle operation parameters representing parameters of the vehicle during the vehicle maneuver, the target grade being indicative of a performance of the vehicle maneuver.

It will be appreciated that the one or more ML models 244 may output a given training scenario by generating one or more training maneuvers (e.g., a series of vehicle maneuvers) associated with the training scenario.

In one or more embodiments, the one or more ML models 244 are further configured to receive as an input one or more of: a target grade, a regulation, and other conditions to generate the vehicle parameters associated with the vehicle maneuver.

In one or more embodiments, the one or more ML models 244 are configured to generate vehicle maneuver parameters in the form of a time series for each vehicle maneuver parameter. The time series corresponds to values of a given vehicle parameter of the vehicle as a function of time during the vehicle maneuver. It will be appreciated that the granularity of the time series, i.e., values of the vehicle operation parameter during the time period may be expressed in minutes, in seconds, in milliseconds, or with an even better granularity.

It is contemplated that in one or more alternative embodiments, the one or more ML models 244 are configured to generate statistical parameters of the one or more vehicle operation parameters (i.e., mean, standard deviation, etc.) as well as to generate explanations for one or more vehicle operation parameter indicative of performance of the trainee. Additionally, the one or more MLAs 224 may be trained to generate the vehicle operation parameters further based on a user profile of the user grading the maneuver. As a non-limiting example, if the user consistently overestimates the performance of his trainees, the one or more MLAs 224 may be configured to provide a greater number of low performance scenarios to the user so as to improve his grading abilities.

The one or more ML models 244 are trained on a set of training objects or training dataset (not depicted), which may be, as a non-limiting example, stored in the database 250. The training dataset includes at least training session data (including maneuvers and vehicle parameters) and instructor rating session data.

In one or more alternative embodiments, the one or more ML models 244 may be trained to adjust the set of vehicle operation parameters according to a target grade. The target grade may be received as an input by the one or more ML models 244.

The one or more ML models 244 may be configured to generate vehicle parameters for a specific vehicle type, vehicle model and regulations.

In one or more embodiments, the one or more ML models 244 are implemented based on neural networks, such as deep neural networks including generative neural networks. Non-limiting examples of generative ML models include Generative Adversarial Networks (GAN), the Recurrent Conditional GAN (RCGAN), the Time GAN (TimeGAN) and the Conditional Sig-Wasserstein GAN (SigCWGAN).

As a non-limiting example, the one or more ML models 244 may be implemented using a restricted Boltzmann machine, i.e., a generative stochastic neural network that can learn a probability distribution over its set of inputs.

The one or more ML models 244 may be trained on the server 230 using methods known in the art that aim to approximate the original probability distribution with a new replicable distribution. As a non-limiting example, the one or more ML models 244 may be trained to optimize a loss function using gradient-based algorithms and backpropagation One or more of the set of parameter-generating models 240 are trained by the server 230. In one or more embodiments, one or more of the set of parameter-generating models 240 are trained by another server (not shown) and once trained may be transmitted to be executed by the server 230 and/or an electronic device such as the first electronic device 210, the second electronic device 212 or any other computing device.

In one or more embodiments, the set of parameter-generating models 240 may be provided by the server 230 to other computing devices, and/or may receive input data therefrom, generate output data and transmit the output data to the computing devices.

In one or more embodiments, the server 230 has access to one or more rule-based models for generating a set of vehicle operation parameters by receiving as an input a vehicle maneuver.

The one or more rule-based model 248 may use target scores and a set of rules predetermined by an operator for generating vehicle operation parameters and vehicle maneuvers. The rules may for example specify ranges of values to generate for one or more vehicle parameters according to a given vehicle parameter and/or a target score.

In one or more embodiments, the rule-based model 248 may acquire past training data and from the database 250 and process the past training data according to the set of rules to generate the vehicle operation parameters and vehicle maneuver. The set of rules may include applying a statistical method, extracting statistical features and applying a condition with an associated confidence level on the statistical features to generate the values of the vehicle operation parameters.

Additionally, the rule-based model 248 may generate the vehicle operation parameters further based on a user profile of the user grading the maneuver. As a non-limiting example, if the user consistently overestimates the performance of his trainees, the rule-based model 248 may be biased to provide a greater number of low performance scenarios for the specific user.

Database

A database 250 is communicatively coupled to the server 230, the first electronic device 210, the vehicle simulator 220, and the second electronic device 212 via the communications network 260 but, in one or more alternative implementations, the database 250 may be communicatively coupled or may be part of one or more of the server 230, the first electronic device 210, the vehicle simulator 220, and the second electronic device 212 without departing from the teachings of the present technology. Although the database 250 is illustrated schematically herein as a single entity, it will be appreciated that the database 250 may be configured in a distributed manner, for example, the database 250 may have different components, each component being configured for a particular kind of retrieval therefrom or storage therein.

The database 250 may be a structured collection of data, irrespective of its particular structure or the computer hardware on which data is stored, implemented or otherwise rendered available for use. The database 250 may reside on the same hardware as a process that stores or makes use of the information stored in the database 250 or it may reside on separate hardware, such as on the server 230. The database 250 may receive data from the server 230 for storage thereof and may provide stored data to the server 230 for use thereof.

In the context of the present technology, the database 250 is configured to store inter alia: (i) one or more vehicle types including one or more vehicle models; (ii) a set of scenarios for each of the one or more vehicle types, each training scenario including one or more vehicle maneuvers and associated parameters; (iii) when available, vehicle regulation data and past grades associated with the training scenario; (iv) user profile and user-related data of users (e.g., user 205); and (v) parameters of the set of parameter-generating models 240 including rule-based models 248 and machine learning models 248.

Communication Network

In one or more embodiments of the present technology, the communications network 260 is the Internet. In one or more alternative non-limiting embodiments, the communication network 260 may be implemented as any suitable local area network (LAN), wide area network (WAN), a private communication network or the like. It will be appreciated that implementations for the communication network 260 are for illustration purposes only. How a communication link 265 (not separately numbered) between the server 230, the database 250, and/or another electronic device (not shown) and the communications network 260 is implemented will depend inter alia on how each electronic device is implemented.

Figure 3:
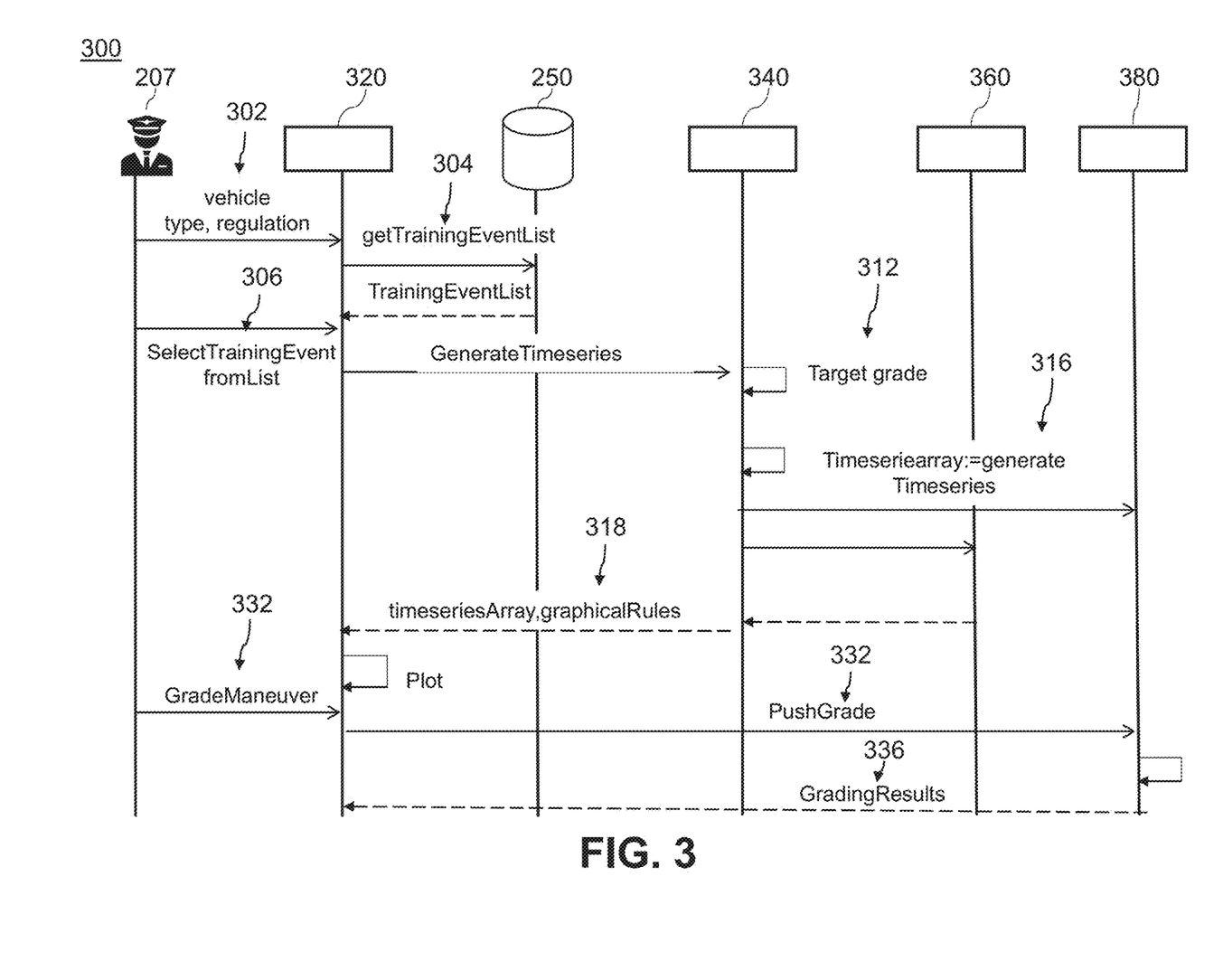
FIG. 3 is a sequence diagram of a vehicle maneuver generation training procedure, in accordance with one embodiment.

With reference to FIG. 3, there is depicted a sequence diagram of a vehicle maneuver generation procedure 300 in accordance with one or more non-limiting embodiments of the present technology.

Vehicle Maneuver Generation Training Procedure

The vehicle maneuver generation training procedure 300 includes inter alia an assessment procedure 320, a parameter generation procedure 340, an adjustment procedure 360 and an evaluation procedure 380.

The vehicle maneuver generation training procedure 300 is executed by the first electronic device 210. In one or more embodiments, the vehicle maneuver generation training procedure 300 may be executed in a distributed manner by a plurality of electronic devices such as the first electronic device 210, and the server 230.

The vehicle maneuver generation training procedure 300 is used to generate vehicle operation parameters for training a user such as the user 205 to grade vehicle maneuvers.

As a non-limiting example, the user 205 may want to learn how to grade landing scenarios using a fighter airplane, and what would constitute a lower performance level i.e., lower grade as well as what would constitute a better performance scenario, i.e. higher grade for a given scenario or maneuver.

The user 205 may select a vehicle type including a vehicle model and a regulation on a IOS functionality 216 interface displayed the touchscreen of the first electronic device 210. The user selection 302 is transmitted to the assessment procedure 320.

The vehicle type is the type of vehicle for which a set of vehicle operation parameters will be generated for training the user 205. In one or more embodiments, the vehicle type comprises one of a land vehicle, an aircraft, a seacraft (sea vehicle) and includes a vehicle model for the vehicle type.

As a non-limiting example, the user 205 may select a fighter aircraft such as the Leonardo Aircraft M-346. In one or more embodiments, the user 205 may also select a regulation type. The regulation type is a set of conditions or constraints that must be respected by the vehicle during a training scenario. The regulation type may be, for example, based on regulations of a country or territory, and relate to the operation of the vehicle model or vehicle type, and may also depend on the training scenario.

It is contemplated that in one or more alternative embodiments, one or more of the vehicle type, the training scenario, and the regulation may be chosen randomly according to user preferences of the user 205, and obtained from the database 250 for example.

The assessment procedure 320 then retrieves, from the database 250, based on the user selection 302, a list of training scenarios 304 associated with the vehicle model. The assessment procedure 320 transmits the list of training scenarios 304 for display to the user 205 via the touchscreen 190. It will be appreciated that each training scenario in the list of training scenarios 304 comprises one or more (i.e., at least one) vehicle maneuvers. As a non-limiting example, for an aircraft landing scenario, the vehicle maneuvers may include approach, flare, touchdown and rollout.

The user 205 may then select one or more training scenarios from the list of training scenarios 304, and the selected scenario 306 is transmitted to one or more of the generation procedure 340 via the assessment procedure 320. The generation procedure 340 executes or uses the set of parameter-generating models 240 to generate a set of vehicle operation parameters 316 based on the selected training scenario 306.

The generation procedure 340 receives a target grade 312. In one or more embodiments, the target grade 312 may be generated randomly. In one or more other embodiments, the target grade 312 may be provided by another user via another computing device. As a non-limiting example, the target grade may be between one and four. The target grade 312 will be used for generating the set of vehicle operation parameters of the vehicle maneuver that will be provided for training the user 205, where the target grade 312 is indicative of an overall performance of a pilot during the vehicle maneuver.

In one or more embodiments, the one or more ML models 244 generates the set of vehicle operation parameters 316 representing the selected vehicle scenario 306. The set of vehicle operation parameters 316 may in the form of a time series for each vehicle parameter of the set of vehicle operation parameters 316. The time series for a given vehicle operation parameter corresponds to a set of values as a function of time during the vehicle maneuver. As a non-limiting example, for the aforementioned aircraft landing training scenario the following vehicle operations parameters could be generated: aircraft's altitude, airspeed, and rate of descent (approach maneuver), pitch, speed, and descent rate (flare maneuver), aircraft's speed, pitch, and vertical speed (touchdown maneuver) and speed, direction, and braking (rollout maneuver). It will be appreciated that non-limiting examples of environmental parameters that could affect the landing scenario include wind speed, wind direction, runway length, runway condition, and visibility. It is contemplated that the environmental parameters associated with the vehicle operation parameters may be generated by the one or more ML models 244.

In one or more alternative embodiments, the one or more rule-based model 248 generates the set of vehicle operation parameters 316 based on the selected vehicle scenario 306. In one or more embodiments, the set of vehicle operation parameters 316 may be retrieved from the database 250 from past training data without modification.

The adjustment procedure 360 adjusts the set of vehicle operation parameters 316 based on the target grade. In one or more other embodiments, the adjustment procedure 360 may be executed together with the assessment procedure 340 such that a training scenario and a target grade are provided as an input to generate the set of vehicle operations parameters 316 according to the target grade.

The purpose of the adjustment procedure 360 is to adjust one or more of the vehicle operation parameters during the scenario such that it would reflect an objective evaluation according to standards and regulations by a certified instructor. As a non-limiting example, for a low target grade (e.g., 1 or 2 out of 4), the values of the parameters could be adjusted to reflect a loss of control of the aircraft from the pilot during the landing scenario. In one or more alternative embodiments, the one or more ML models 244 is configured to generate the set of vehicle operation parameters as a function of the target grade, i.e., the one or more MLA directly generates the vehicle operation parameters reflecting the target grade by receiving as an input the target grade in addition to the desired scenario.

It will be appreciated that one or more vehicle parameters may have a relative higher importance than others for rating a given vehicle maneuver, i.e. some vehicle parameters have a higher impact than other vehicle parameters when assessing a performance of the vehicle maneuver, and such parameters may be given a higher consideration for the vehicle maneuver based on the target grade when generating the vehicle parameters. In one or more embodiments, the relative importance of the parameters according to the target grade may be determined based on task analysis and theoretical knowledge of parameters values and behaviors required to complete each maneuver or scenario. In such embodiments, the target grade associated with an indication of parameters to adjust for a scenario may be stored in memory (e.g., received from the database 250).

In one or more other embodiments, the relative importance of the parameters according to the target grade may be determined by performing statistical generation by analyzing multiple performances of the same maneuver, which could enable the establishment of confidence interval around flight parameters (e.g., parameters target value zone). It is also contemplated that historical errors, incidents and undesirable states could conversely be used to define abnormal ranges of parameters (e.g., exceedances or parameters risk zone). It will be appreciated that machine learning model may be trained and/or used to determine the relative importance of the parameters according to the scenario with vehicle maneuvers.

In one or more embodiments, the set of vehicle operation parameters 316 representing the training scenario associated with the target grade 312 are transmitted to the generation procedure 340 or the adjustment procedure 360.

The generation procedure 340 or the adjustment procedure 360 generates, based on the set of vehicle operation parameters 316 representing the training scenario, one or more graphical representations 318 of the set of vehicle operation parameters. The one or more graphical representations include: values, plots, charts, drawings detailing evolution of the set of vehicle operation parameters during the training scenario.

In one or more embodiments, the generation procedure 340 or the adjustment procedure 360 may generate simulated images or videos of the vehicle maneuver based on the set of vehicle operation parameters 316, which may then be transmitted for analysis by the user 205. In one or more alternative embodiments, the assessment procedure 340 generates the graphical representations 318.

The graphical representation of the set of vehicle operation parameters 316 is then transmitted for display on the first electronic device 210 of the user 205. In one or more embodiments, the graphical representations 318 generated based on vehicle operation parameters 316 are transmitted for display on more than one output component of the first electronic device 210.

The IOS functionality 216 may enable the user 205 to interact with the graphical representations of the set of vehicle operation parameters 316 representing the vehicle maneuver. In this way, the user 205 may analyze the vehicle maneuver via the set of vehicle operation parameters or its graphical representation, and provide a subjective grade 332 indicating his assessment of the performance of the vehicle maneuver via the touchscreen 190 of the first electronic device 210.

The evaluation procedure 380 then receives the subjective grade 332 provided by the user 205 and the target grade used for generating the set of vehicle operation parameters. The evaluation procedure 380 is configured to compare the subjective grade 332 with the target grade 312, and provide comparison results 336 for display to the user 205 based on a result of the comparison. In one or more embodiments, the comparison results 336 may include recommendations.

In one or more embodiments, the evaluation procedure 380 receives or determines the relative importance of the vehicle parameters for the training scenario, with confidence ranges or required regulations, and provides an indication of the expected values or regulations for the vehicle parameter which influences the rating of the given scenario and/or vehicle maneuvers.

In one or more embodiments, the recommendations are provided based on past training data and comments stored in the database 250, or based on the list of relative importance of vehicle parameters during the vehicle maneuver. In one or more embodiments, the comparison results 336 include recommendations generated based on the comparison of the subjective grade and the target grade and/or vehicle parameters with threshold or intervals. It will be appreciated that the recommendation may be in graphical form (e.g., markings and indications on charts, plots, images, videos, animations), in textual form (e.g., generated using natural language processing (NLP) models and/or based on past comments in the database 250 and/or determined data and regulations).

Figure 4:
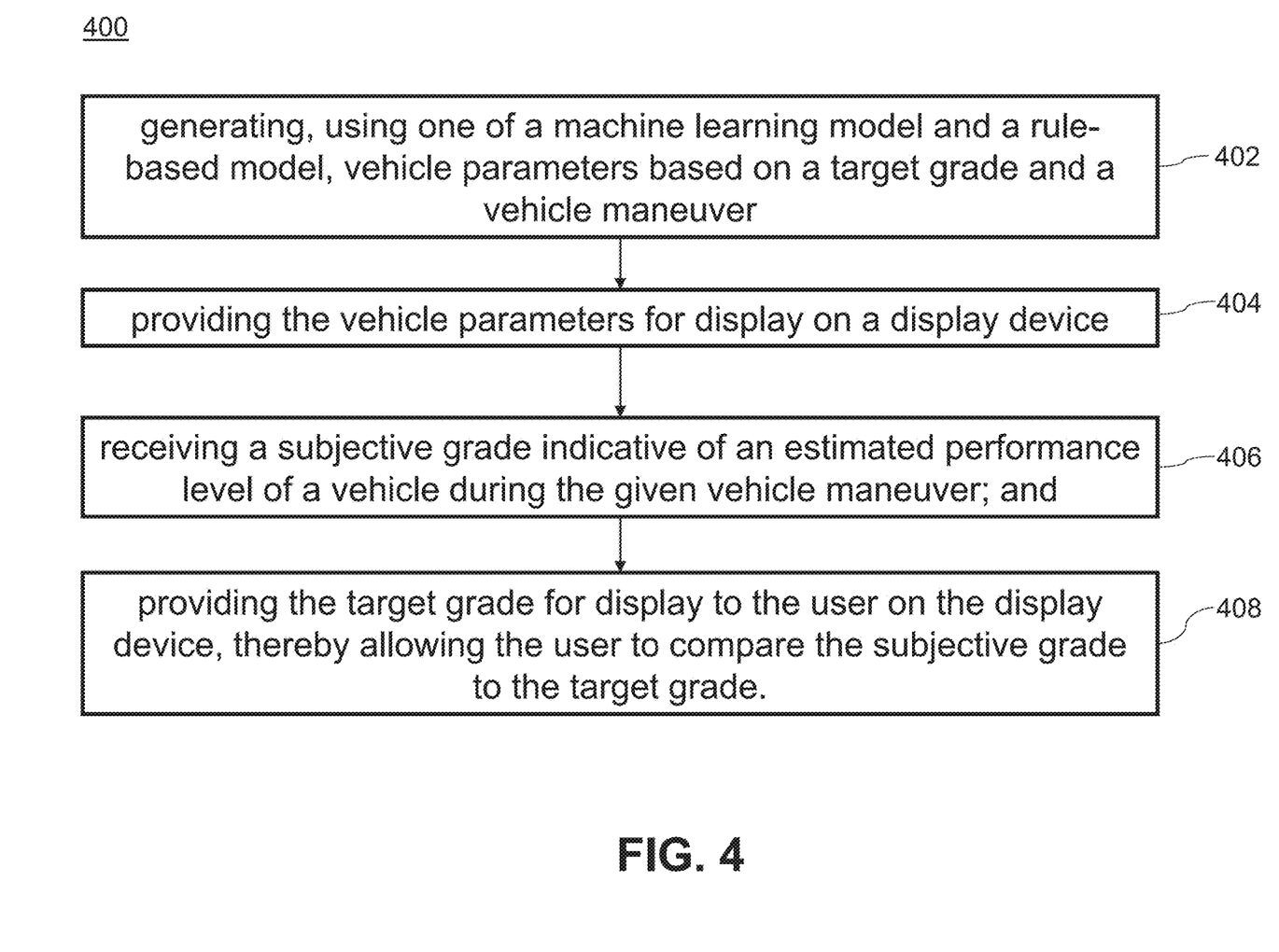
FIG. 4 is a flow chart illustrating a computer-implemented method for training a user to score a vehicle maneuver in accordance with one embodiment.

FIG. 4 depicts a flowchart of one embodiment of a method 400 for training user to score a vehicle maneuver, the method 400 being executed in accordance with one or more non-limiting embodiments of the present technology.

The method 400 is executed for training a user (e.g., user 205) to score one or more vehicle maneuvers, which may be part of a scenario or event, by generating vehicle operation parameters associated with the one or more vehicle maneuvers based on a target grade.

The method 400 is executed by at least one computer processor operatively connected to at least one non-transitory storage medium and a display device.

In one or more embodiments, the electronic device 100 comprises at least one processor such as the processor 110 and/or GPU 111 and a non-transitory computer readable storage medium such as the solid-state drive 120 and/or the random-access memory 130 storing computer-readable instructions. The at least one processor, upon executing the computer-readable instructions, is configured to execute the method 400. It will be appreciated that the method 400 may be executed by another electronic device or by more than one electronic device.

The method 400 begins at processing step 402.

According to processing step 402, the at least one processor generates a set of vehicle operation parameters 316 representing a vehicle maneuver based on a target by using one or more of the set of parameter-generating models 240. The set of parameter-generating models 240 may include at least one of: the one or more ML models 244 and the one or more rule-based model 248.

The one or more MLAs 244 may, as a non-limiting example, include generative neural networks (e.g., Generative Adversarial Networks (GAN), the Recurrent Conditional GAN (RCGAN), Time GAN (TimeGAN, Conditional Sig-Wasserstein GAN (SigCWGAN)) and restricted Boltzmann machines.

In one or more embodiments where the one or more MLAs 244 are used, the at least one processor may have performed training of the one or more MLAs 244 based on past vehicle maneuvers, past vehicle operation parameters and past scores.

In one or more embodiments, the at least one processor generates or adjusts the set of vehicle operation parameters 316 based on a target grade 312.

In one or more embodiments, the at least one processor receives the set of vehicle operation parameters 316 based on a target grade and maneuver input to at least one the parameter-generating models 240. In one or more embodiments, the generating the vehicle parameters comprises receiving a relative importance of at least one vehicle parameter according to the target grade for the vehicle maneuver and generating the at least one vehicle parameter based on the relative importance of the at least one vehicle parameter.

The set of vehicle operation parameters 316 may be in the form of a time series for each vehicle parameter of the set of vehicle operation parameters 316. The time series for a given vehicle operation parameter corresponds to a set of values as a function of time during the vehicle maneuver.

According to processing step 404, the at least one processor provides the set of vehicle operation parameters 316 for display to the user 205. In one or more embodiments, the providing includes generating, based on the set of vehicle operation parameters 316 representing the vehicle during the vehicle maneuver, one or more graphical representations 318 of the set of vehicle operation parameters 316. The one or more graphical representations 318 may include one or more of: values, plots, charts, and drawings detailing evolution of the set of vehicle operation parameters.

In one or more embodiments, the at least one processor is configured to generate one or more of: a simulation, a sequence of images, a video, and an animation of at least a portion of the maneuver based on the vehicle operation parameters 316.

In one or more embodiments, the parameters are displayed on at least one display device of the first electronic device 210 associated with the user 205. Additionally or alternatively, the vehicle operation parameters 316 and/or a graphical depiction of the maneuver may be displayed on a plurality of display devices, such as displays in the vehicle simulator 220, display screen, VR headsets and the like.

According to processing step 406, the at least one processor receives the subjective grade 332 provided by the user 205, the subjective grade 332 being indicative of the performance level of the user 207 during the vehicle maneuver as determined by the user 205.

According to processing step 408, the at least one processor provides the target grade 312 for display to the user on the display device, thereby allowing the user 205 to compare the subjective grade 332 to the target grade 312.

In one or more embodiments, the at least one processor is configured to compare the subjective grade 332 with the target grade 312, and provide comparison results 336 for display to the user 205 based on a result of the comparison. In one or more embodiments, the comparison results 336 may include or be used for recommendations generated based on the comparison of the subjective grade and the target grade and/or vehicle parameters with threshold or intervals. It will be appreciated that the recommendation may be in graphical form (e.g., markings and indications on charts, plots, images, videos, animations), in textual form (e.g., generated using natural language processing (NLP) models and/or based on past comments in the database 250 and/or determined data and regulations) or a combination thereof.

The method 400 ends.

It will be appreciated that the method 400 may be executed for different types of vehicles, such as land vehicles, aircrafts and sea vehicles.

In one or more embodiments, the method 400 may be executed by applying gamification techniques and in the form quizzes or assessments, which can help instructors in areas of focus.

One or more embodiments of the present technology enable generating interactive simulations that enable instructors to engage more in depth with the material, where the simulation of the maneuver could be performed in low-fidelity or high-fidelity flight simulation devices.

One or more embodiments of the present technology enable providing visual aids and support, in the form of a sequences of images, videos, or animations can help instructors better understand complex concepts. As a non-limiting example, a video showing a step-by-step execution of a maneuver or its textual description generated based on the generated vehicle parameters may be provided to the instructors.

One or more embodiments of the present technology enable simulating providing real-world examples, which can help instructors relate theoretical concepts as well as standard operating procedures to practical situations.

One or more embodiments of the present technology can be used to provide gamification techniques including challenges, goals, rewards, feedback and/or competition between users to encourage progress.

One or more embodiments of the present technology can be used to provide feedback such as quizzes or assessments, which can help instructors in areas of focus.

It will be appreciated that not all technical effects mentioned herein need to be enjoyed in each and every embodiment of the present technology. For example, one or more embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

The invention claimed is:

1. A computer-implemented method for training a user to score a vehicle maneuver, the method being executed by at least one processor, the method comprising:
generating, using one of a machine learning model and a rule-based model, vehicle parameters based on a target grade and a vehicle maneuver, the target grade being indicative of a given performance level of a pilot performing the vehicle maneuver, the vehicle parameters representing parameters of the vehicle during the vehicle maneuver, the vehicle parameters enabling evaluating a performance of the pilot during the vehicle maneuver;
providing the vehicle parameters for display on a display device;
receiving, from a user device, a subjective grade indicative of an estimated performance level of the pilot during the vehicle maneuver; and
providing the target grade for display to the user on the display device, thereby allowing the user to compare the subjective grade to the target grade.

2. The computer-implemented method of claim 1, wherein the generating the vehicle parameters is performed further based on at least one of a given vehicle model and a regulation level.

3. The computer-implemented method of claim 1, further comprising comparing the subjective grade to the target grade, thereby obtaining a comparison result and providing the comparison result for display on the display device.

4. The computer-implemented method of claim 3, wherein the comparison result comprises comparison parameters, and wherein the computer-implemented method further comprises:
generating at least one graphical representation based on the comparison parameters and the vehicle parameters; and
providing the at least one graphical representation for display on the display device.

5. The computer-implemented method of claim 4, wherein the at least one graphical representation comprises at least one of: a sequence of images, a video, an animation and a simulation detailing the vehicle maneuver.

6. The computer-implemented method of claim 1, further comprising:
generating a vehicle simulation based on the vehicle parameters; and
providing the vehicle simulation for display on the display device.

7. The computer-implemented method of claim 1, wherein the vehicle is one of: an aircraft, a land vehicle, and a sea vehicle.

8. The computer-implemented method of claim 1, wherein the display device comprises a plurality of display devices, a given one of the plurality of display devices being part of a vehicle simulator.

9. The computer-implemented method of claim 1, further comprising generating the target grade based on one of: a random number and a user profile of the user scoring the vehicle maneuver.

10. The computer-implemented method of claim 1, wherein
the vehicle maneuver comprises: a take-off, a landing, a straight line, a landing, a take-off with an engine failure, and a landing with an engine failure; and
wherein the vehicle parameters comprise at least one of: an airspeed, a bank angle, a pitch, and a sequence of switches activated by the pilot.

11. The computer-implemented method of claim 1, wherein the generating the vehicle parameters is performed based on sets of previous vehicle parameters, each set of the previous vehicle parameters being associated with the given vehicle maneuver having been performed by a respective pilot having received the target grade.

12. The computer-implemented method of claim 1, wherein the generating the vehicle parameters comprises:
receiving a relative importance of at least one vehicle parameter according to the target grade for the vehicle maneuver and generating the at least one vehicle parameter based on the relative importance of the at least one vehicle parameter.

13. The computer-implemented method of claim 12, further comprising, prior to the receiving the relative importance of the at least one vehicle parameter according to the target grade for the vehicle maneuver: determining the relative importance of the at least one vehicle parameter based on one of: a confidence interval, and past parameters for the given maneuver.

14. A system for training a user to score a vehicle maneuver, the system comprising:
at least one processor; and
a non-transitory storage medium operatively connected to the at least one processor, the non-transitory storage medium comprising computer-readable instructions;
the at least one processor, upon executing the computer-readable instructions, being configured for:
generating, using one of a machine learning model and a rule-based model, vehicle parameters based on a target grade and a vehicle maneuver, the target grade being indicative of a given performance level of a pilot performing the vehicle maneuver, the vehicle parameters representing parameters of the vehicle during the vehicle maneuver, the vehicle parameters enabling evaluating a performance of the pilot during the vehicle maneuver;
providing the vehicle parameters for display on a display device operatively connected to the at least one processor;
receiving, from a user device operatively connected to the at least one processor, a subjective grade indicative of an estimated performance level of a vehicle during the vehicle maneuver; and
providing the target grade for display to the user on the display device, thereby allowing the user to compare the subjective grade to the target grade.

15. The system of claim 14, wherein the at least one processor is further configured for:
comparing the subjective grade to the target grade, thereby obtaining a comparison result and providing the comparison result for display on the display device.

16. The system of claim 14, wherein the at least one processor is further configured for:
generating the target grade based on one of: a random number and a user profile of the user scoring the vehicle maneuver.

17. The system of claim 14, wherein
the vehicle maneuver comprises: a take-off, a landing, a straight line, a landing, a take-off with an engine failure, and a landing with an engine failure; and
wherein the vehicle parameters comprise at least one of: an airspeed, a bank angle, a pitch, and a sequence of switches activated by the pilot.

18. The system of claim 14, wherein the generating the vehicle parameters is performed based on sets of previous vehicle parameters, each set of the previous vehicle parameters being associated with the given vehicle maneuver having been performed by a respective pilot having received the target grade.

19. The system of claim 14, wherein the generating the vehicle parameters comprises: receiving a relative importance of at least one vehicle parameter according to the target grade for the vehicle maneuver and generating the at least one vehicle parameter based on the relative importance of the at least one vehicle parameter.

20. A computer-implemented method for training a machine learning model to generate vehicle parameters representing a vehicle maneuver, the method being executed by a processor, the method comprising:

receiving, from a database, previous vehicle maneuvers, each one of the previous vehicle maneuvers being associated with:
a respective set of previous vehicle parameters indicative of a respective previous vehicle maneuver having been performed by a respective pilot; and
a respective grade indicative of a performance level of the respective pilot during the respective previous vehicle maneuver;
generating a set of training objects, each training object including a respective previous vehicle maneuver, the respective grade and the respective set of vehicle parameters; and
training, the machine learning model to generate the vehicle parameters based on a target grade and the respective previous vehicle maneuver, the training being based on the set of training objects; and
outputting a trained machine learning model.

* * * * *